US008935820B2

(12) United States Patent
Mileti

(10) Patent No.: US 8,935,820 B2
(45) Date of Patent: Jan. 20, 2015

(54) EXPANDABLE STRUCTURE CONSTRUCTED FROM SEALED FILMS

(71) Applicant: Robert J. Mileti, Torrington, CT (US)

(72) Inventor: Robert J. Mileti, Torrington, CT (US)

(73) Assignee: Trlby Innovative LLC, Torrington, CT (US)

(*) Notice: Subject to any disclaimer, the term of this patent is extended or adjusted under 35 U.S.C. 154(b) by 0 days.

(21) Appl. No.: 13/764,413

(22) Filed: Feb. 11, 2013

(65) Prior Publication Data

US 2013/0205505 A1  Aug. 15, 2013

Related U.S. Application Data

(60) Provisional application No. 61/597,529, filed on Feb. 10, 2012.

(51) Int. Cl.
| | |
|---|---|
| *A47C 17/00* | (2006.01) |
| *B32B 38/00* | (2006.01) |
| *A47C 27/08* | (2006.01) |
| *A47C 7/02* | (2006.01) |
| *A61G 7/057* | (2006.01) |
| *B29D 22/02* | (2006.01) |

(52) U.S. Cl.
CPC ............. *B32B 38/0004* (2013.01); *A47C 27/08* (2013.01); *A47C 7/021* (2013.01); *A47C 27/081* (2013.01); *A61G 7/05769* (2013.01); *B29D 22/02* (2013.01); *A61G 2200/16* (2013.01)
USPC ........................................ 5/690; 5/706; 5/710

(58) Field of Classification Search
CPC .... A47C 27/081; A47C 27/10; A47C 27/087; A47C 27/085; A47C 27/082; A47C 27/18; A47C 27/001; A47C 27/144; A47C 31/105; A61G 7/05769; A61G 7/05776; A61G 7/1021; Y10S 5/932; Y10S 297/08
USPC ............. 5/690, 682, 683, 706, 707, 710–712, 5/654
See application file for complete search history.

(56) References Cited

U.S. PATENT DOCUMENTS

| | | | | |
|---|---|---|---|---|
| 2,604,641 | A | | 7/1952 | Reed |
| 2,934,867 | A | | 5/1960 | Vogt |
| 4,329,748 | A | * | 5/1982 | Finkelstein ................... 5/683 |
| 5,060,328 | A | * | 10/1991 | Larson ........................ 5/683 |
| 5,253,377 | A | * | 10/1993 | Larson ........................ 5/679 |
| 5,727,270 | A | * | 3/1998 | Cope et al. ................... 5/710 |
| 6,317,909 | B1 | * | 11/2001 | Blum ........................... 5/654 |
| D540,098 | S | * | 4/2007 | Montazami .............. D6/604 |
| 7,774,881 | B2 | * | 8/2010 | Friedrichs .................. 5/713 |
| 2004/0143906 | A1 | * | 7/2004 | Kasatshko et al. ........... 5/713 |
| 2008/0078032 | A1 | * | 4/2008 | Boyd .......................... 5/710 |
| 2011/0027507 | A1 | | 2/2011 | Mileti |
| 2011/0097521 | A1 | | 4/2011 | Gavin et al. |
| 2013/0146216 | A1 | | 6/2013 | Mileti |

OTHER PUBLICATIONS

International Search Report & Written Opinion of the International Searching Authority Application No. PCT/US2013/025545 Completed: Mar. 20, 2013; Mailing Date: Apr. 4, 2013 6 pages.

* cited by examiner

*Primary Examiner* — William Kelleher
*Assistant Examiner* — Richard G Davis
(74) *Attorney, Agent, or Firm* — St. Onge Steward Johnston & Reens LLC

(57) ABSTRACT

An expandable structure is manufactured using sheets of thermoplastic material sealed together. The expandable structure has a concertina pattern on its sides that allows the structure to expand and collapse like an accordion. The concertina pattern is cut into the sheets of material rather than being folded into the material to speed up the manufacturing process.

19 Claims, 11 Drawing Sheets

EXPANDABLE STRUCTURE CONSTRUCTED FROM SEALED FILMS

FIELD OF THE INVENTION

The present teachings relate generally to expandable structures constructed from sealable films and methods for manufacturing the same.

BACKGROUND OF THE INVENTION

Expandable structures are used in a variety of applications. For example, accordion bags are commonly employed in water and air mattresses, air bags for vehicles, and for storage and delivery of medical, pharmaceutical and consumer fluids. In addition, methods for manufacturing accordion bags from films, such as thermoplastic materials, are known. These methods typically involve primary folding processes before any sealing takes place. The folding of the material is cumbersome, slows down manufacturing time, and makes it expensive.

Therefore, it would be beneficial to have a superior system and method for manufacturing expandable structures. In particular, it is desirable that the manufacturing process requires minimal or no folding steps.

SUMMARY OF THE INVENTION

The needs set forth herein as well as further and other needs and advantages are addressed by the present embodiments, which illustrate solutions and advantages described below.

One method of the present embodiment includes the steps, but is not limited to, joining together a first and second sheet of material with a seal along the lengths of the sheets; cutting the first and second sheets along the seal; joining at least a portion of the periphery of a third sheet of material to at least a portion of the periphery of the first sheet; joining at least a portion of the periphery of a fourth sheet of material to at least a portion of the periphery of the second sheet; and cutting a concertina pattern along at least a portion of the periphery of the sheets. The expandable structure is adapted to be inflated with a fluid so that the sheets form a generally rectangular shape having a concertina pattern on its sides.

One system of the present embodiment includes, but is not limited to, a first sheet of material having first and second ends along its length; a second sheet of material having first and second ends along its length; a third sheet of material having first and second ends along its length; a fourth sheet of material having first and second ends along its length; a fifth sheet of material having first and second ends along its length; and a sixth sheet of material having first and second ends along its length. The second end of the first sheet is joined to the first end of the second sheet, the second end of the second sheet is joined to the first end of the third sheet, the second end of the third sheet is joined to the first end of the fourth sheet, the second end of the fourth sheet is joined to the first end of the fifth sheet, the second end of the fifth sheet is joined to the first end of the sixth sheet, and the second end of the sixth sheet is joined to the first end of the first sheet. The expandable structure is adapted to be inflated with a fluid so that the sheets form a generally rectangular shape having a concertina pattern on its sides.

In another embodiment, the method of the present embodiment includes the steps, but is not limited to, joining a first and a second sheet of material with a plurality of seals along the lengths of the sheets; cutting the first and second sheets along the seals; cutting a concertina pattern into the first and second sheets; joining at least a portion of the periphery of a third sheet of material to at least a portion of the periphery of the first sheet; and joining at least a portion of the periphery of a fourth sheet of material to at least a portion of the periphery of the second sheet. A plurality of cells is created with a cell between seals. The expandable structure is adapted to be inflated with a fluid such that when inflated the expandable structure has a concertina pattern on its sides and each cell forms a generally rectangular shape.

In another embodiment, the system of the present embodiment includes, but is not limited to, two side walls of material; a plurality of cells between the two side walls; and a plurality of baffles, each baffle separating an adjacent pair of the plurality of cells. The plurality of interior baffles is formed from two sheets of material joined together with a plurality of seals along the lengths of the sheets and the two sheets have a concertina pattern cut into them.

In still another embodiment, the system of the present embodiment includes, but is not limited to, a first sheet of material having first and second ends along its length; a second sheet of material having first and second ends along its length; and a third sheet of material having first and second ends along its length. The second end of the first sheet is joined to the first end of the second sheet and the second end of the second sheet is joined to the first end of the third sheet. The expandable structure is adapted to be inflated with a fluid so that it has a concertina pattern on its sides and the expandable structure is adapted to be stored in a substantially flat form when un-inflated.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments.

One object of the present teachings is to provide a novel method for manufacturing expandable structures normally in flat form but readily expansible into the form of a container having substantially rectangular side and end walls. The side and end walls may have a concertina (e.g., zigzag, etc.) pattern cut into the rectangular form. In addition the end walls may have a uniquely related seam formed by sealing the edges of a film material.

Figure 1:
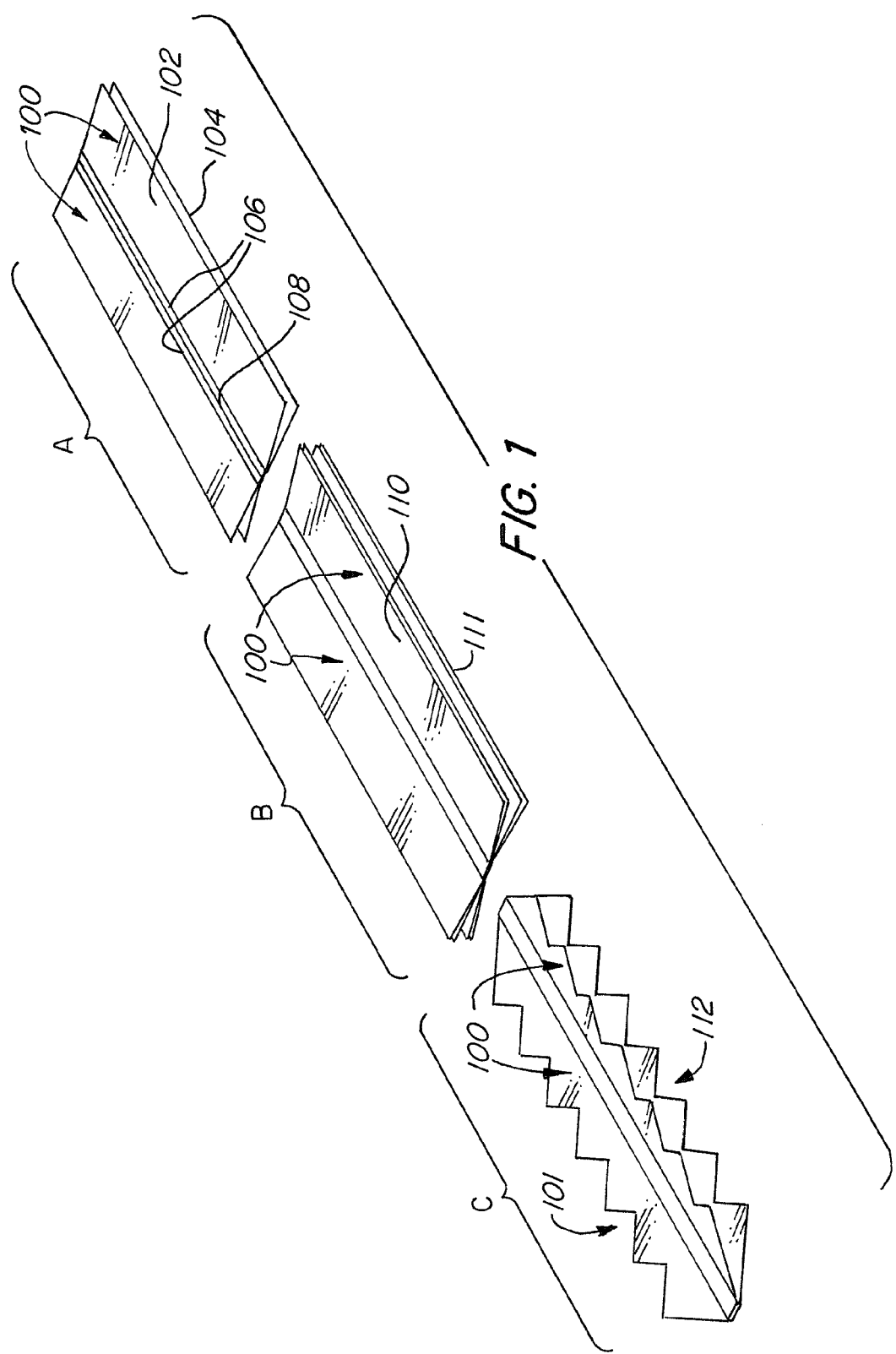
FIG. 1 is a top perspective view of a process for creating an expandable structure according to the present teachings.

Referring now to FIG. 1, shown is a top perspective view of a process for creating an expandable structure 101 according to the present teachings. For ease of reference, steps in FIG. 1 that may be performed are labeled as A, B, C. However, any number of steps may be utilized, in any order, without deviating from the present teachings. Although thermoplastics is specifically identified as a potential material, one skilled in the art would appreciate that any number of different materials may be used and the present teachings are not limited to any particular embodiments disclosed herein.

As shown in step "A", a first sheet 102 of material (e.g., thermoplastic, etc.) is placed on top of a second sheet 104 of material. Two parallel lines of seals 106 (or a single line cut in two, etc.) is placed down the longitudinal axis of the first 102 and second sheet 104 resulting in a pair of two v-folded side panels 100 with a top and bottom outer surface, top and bottom inner surface and exposed side edge. In one embodiment, lines of seals 106 may be non-continuous, although not limited thereto.

A cut 108 (close-up shown in FIG. 2) is made between the two seals 106. In one embodiment, lines of cuts 108 may be non-continuous, although not limited thereto. In a preferred embodiment, the cutting and sealing may be performed simultaneously as a cut/seal step. Optionally, the v-folded side panels may be pre-formed and provided as folded sheets, although not limited thereto.

Now referring to step "B", a top sheet 110 is placed adjacent to and expanding across the outer surface of the top of the side panels 100 and a bottom sheet 111 is placed adjacent to and expanding across the outer surface of the bottom of the panels 100.

According to step "C", a concertina (zigzag) pattern 112 is cut along the exposed side edges of the side panels 100. The top 110 and bottom sheets 111 are sealed to the outer surface of each side panel 100 creating a bellows form. In the preferred embodiment, the zigzag pattern may be cut and sealed simultaneously in a cut/seal step. Although a concertina pattern is specifically identified as a potential pattern, one skilled in the art would appreciate that any number of different patterns may be used and the present teachings are not limited to any particular embodiments disclosed herein.

In an alternative embodiment, a first end sheet of thermoplastic material is placed on top of a second sheet of thermoplastic material. A cut is made down the longitudinal axis of the first sheet and second sheet followed by sealing along the cut line to create the v-folded side panels.

Sealing may occur by any method commonly employed in the art to join films. Particularly, the methods disclosed in U.S. Pat. Pub. No. 20110027507, incorporated herein by reference in its entirety, are preferred. These methods may allow the top and bottom sheets to be sealed to the side panels without having the inner surfaces of the side panels seal to one another. However, the term "seal" herein refers to any method for attaching two structures to each other, and the present teachings are not limited to any particular embodiment disclosed herein. Methods for sealing are also disclosed in U.S.

patent application Ser. No. 13/708,571, entitled Cell Matrix System and Method for Manufacturing Same, which is incorporated herein by reference in its entirety.

Sealing may include providing openings that allow fluid communication (e.g., air, water, etc.) between adjacent sections as well as allow the sections to separate when inflated (e.g., with air, fluid, etc.). Openings can be of various sizes depending on the desired shape of the structure, and the present teachings are not limited to any particular embodiments disclosed herein. Openings may be created by a non-continuous seal, although not limited thereto.

Figure 2:
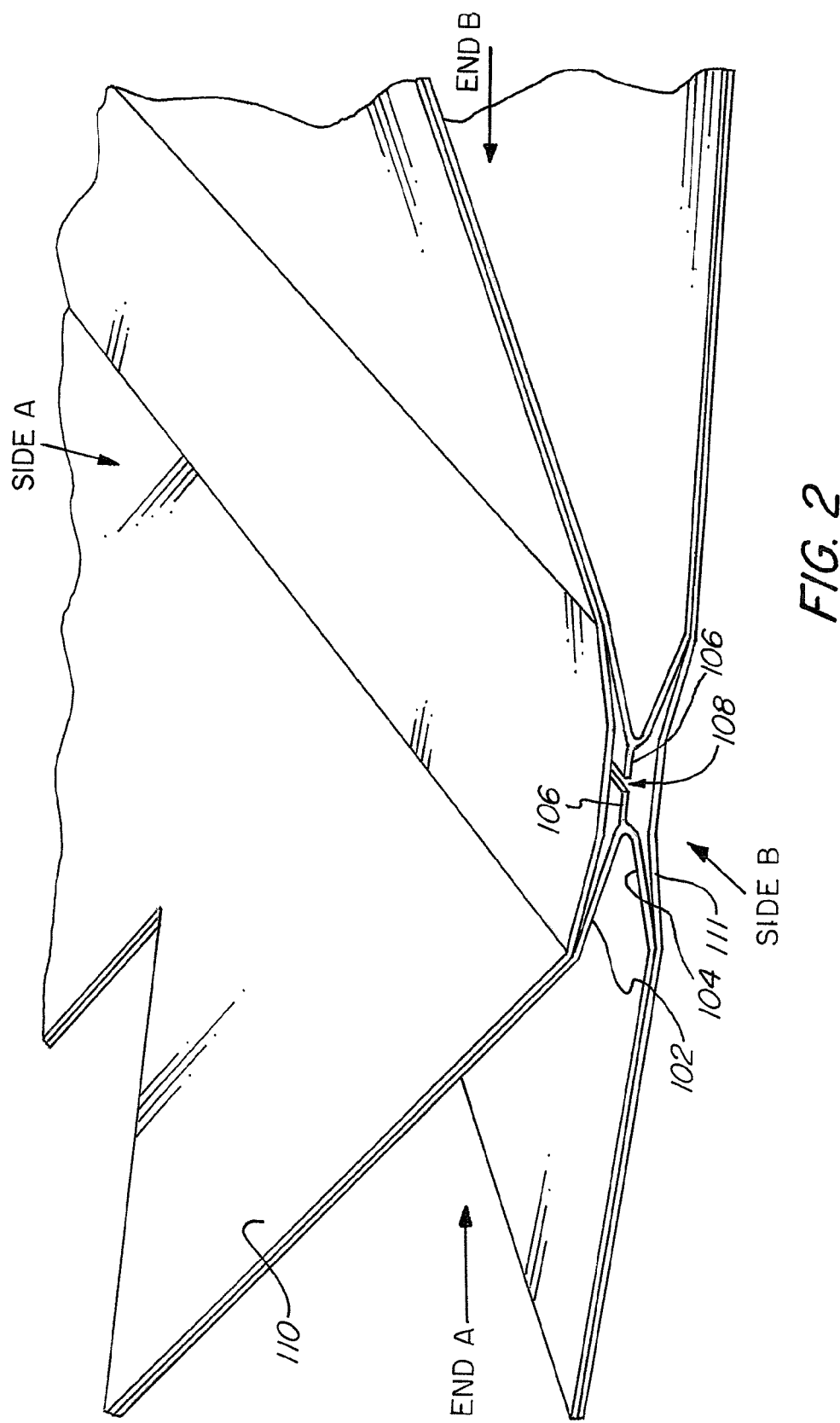
FIG. 2 is close-up end view of the side panels of the expandable structure according to FIG. 1.

Referring now to FIG. 2, shown is a close-up end view of the side panels 100 of the expandable structure 101 according to FIG. 1. As shown, the top sheet 110 and bottom sheet 111 are joined (e.g., sealed, etc.) to the first sheet 102 and second sheet 104 to create sections (e.g., bellows) that can be inflated. Also shown is a close-up of the cut 108 between the two seals 106.

Figure 3:
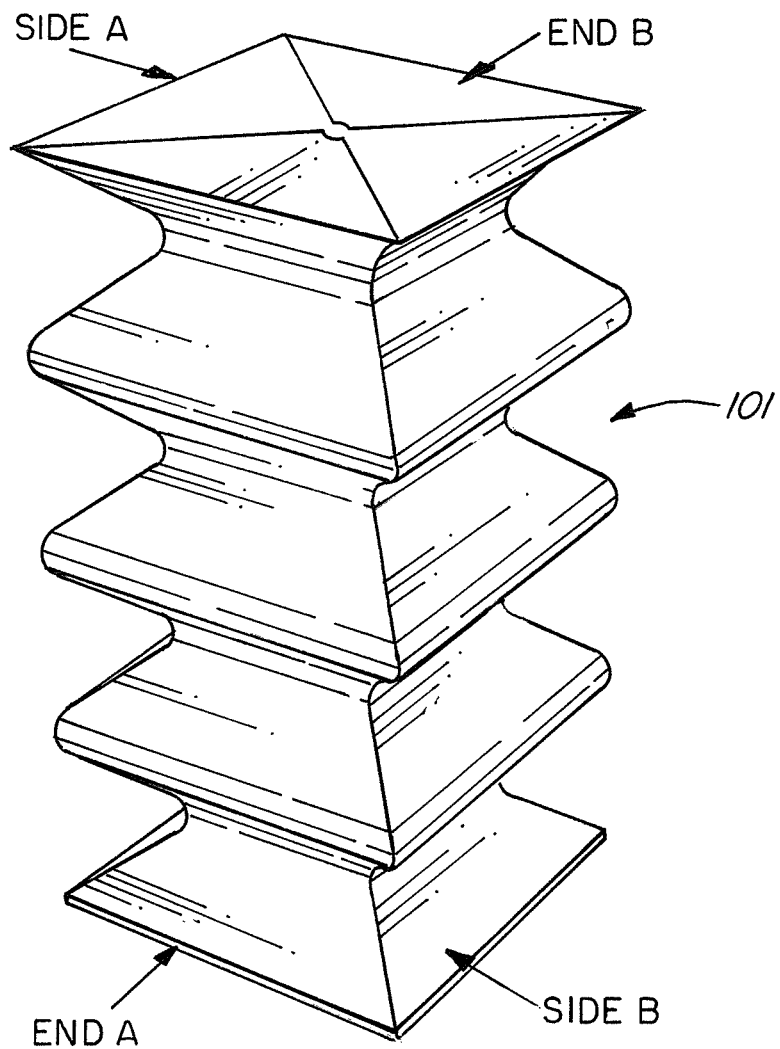
FIG. 3 is a perspective view of the expandable structure of FIG. 2 inflated.

Referring now to FIG. 3, shown is a perspective view of the expandable structure 101 of FIG. 2 inflated. It is to be appreciated that an expandable structure manufactured according to the present teachings may be inflated with any number of different substances, whether gas (e.g., air), liquids (e.g., water), etc. When the expandable structure 101 is inflated, the bellows of the side panels 100 (shown in FIG. 2) expand. The concertina pattern allows the expandable structure 101 to expand and collapse like an accordion. Sides A, B and ends A, B correspond to those shown in FIG. 2.

Figure 4:
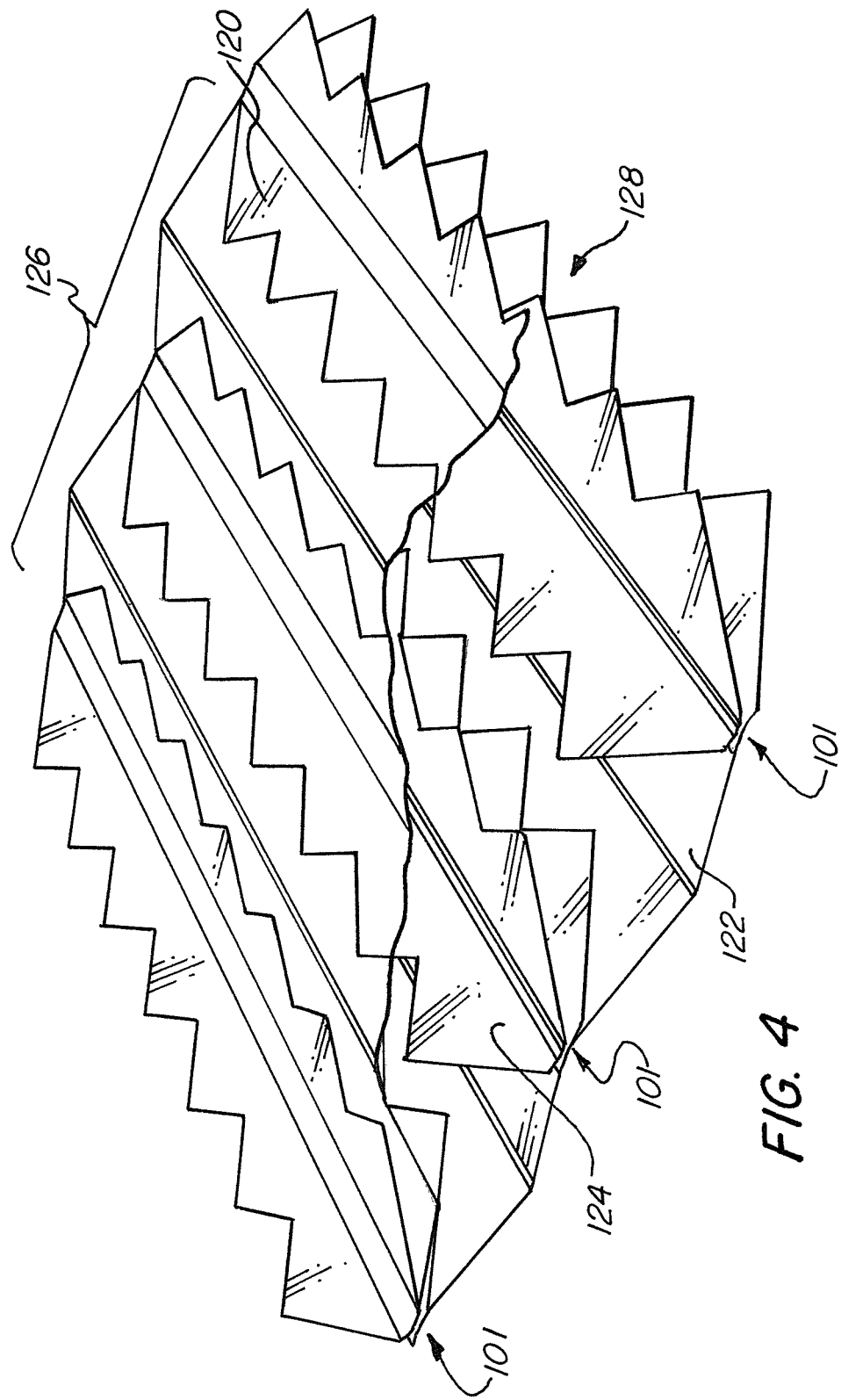
FIG. 4 is a perspective end view of three of the structures of FIG. 1 used to form interior baffles in an expandable structure having a long side wall.

Referring now to FIG. 4, shown is a perspective end view of three of the structures of FIG. 1 used to form interior baffles 124 in an expandable structure having a long side wall 126. Interior baffles 124 may help maintain the proper profile of structures with long side walls while also allowing them to collapse, which facilitates dense packing.

The baffles 124 may be formed of expandable structures 101 as described above in reference to FIG. 1. As shown, three concertina panel sets (e.g., expandable structures 101) may be placed in parallel along a bottom sheet 122 of material that acts as a side wall. To form an expandable structure, the panels are covered with a top sheet 120 of material placed adjacent to and expanding across the outer surface of the panels. The side walls may be joined (e.g., sealed) to the concertina edge of each panel. The expandable structure has a long side wall 126 and an end 128 and interior baffles 124 help the structure to maintain its shape. Although three expandable structures 101 are depicted, it is to be appreciated any number of structures (pairs of panels or even single panels) may be used in any configuration and the present teachings are not limited to any particular embodiment disclosed herein.

Figure 5:
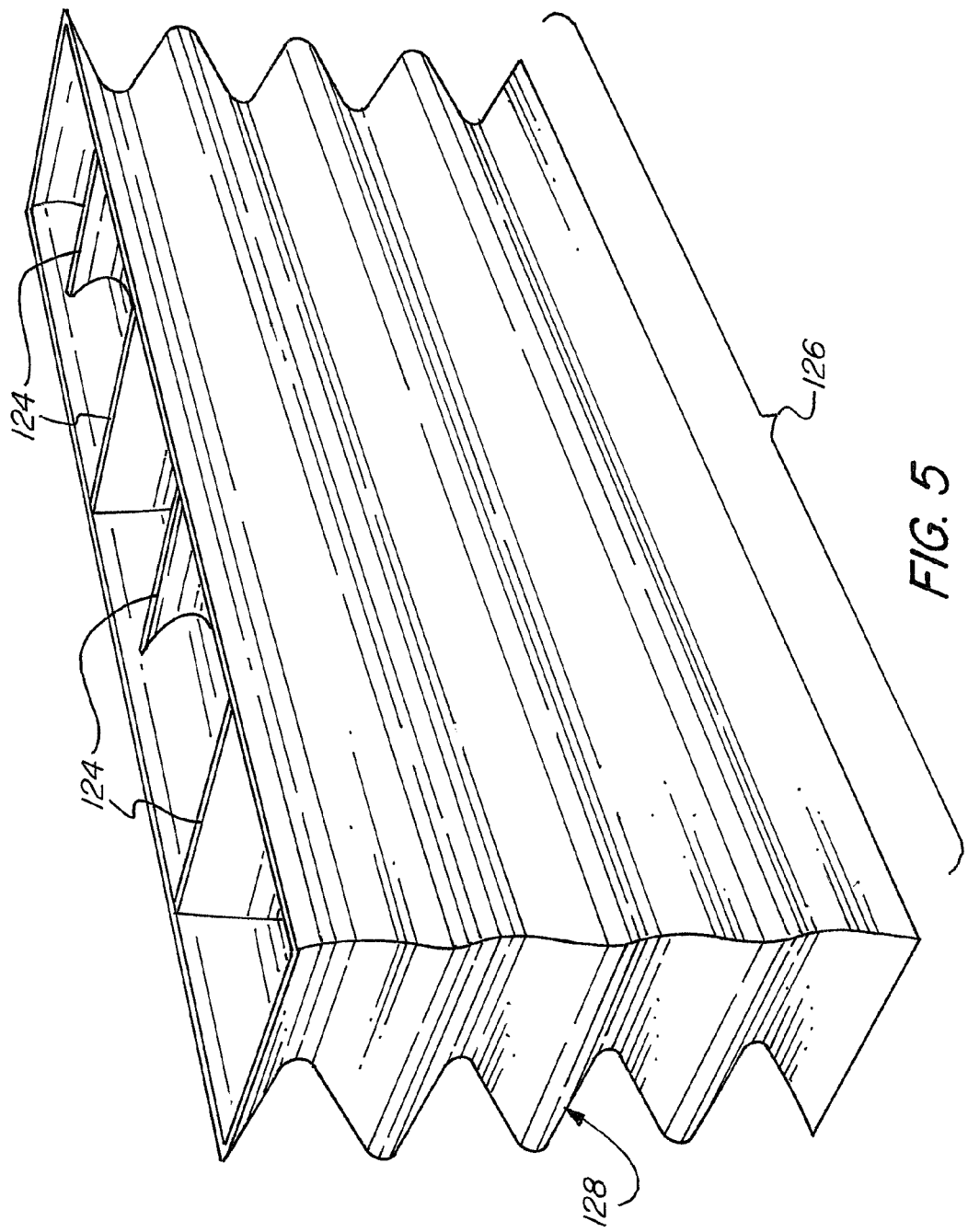
FIG. 5 is a perspective side view of one embodiment of an expandable structure having a long side wall according to FIG. 4.

Referring now to FIG. 5, shown is a perspective side view of one embodiment of an expandable structure having a long side wall 126 according to FIG. 4. This is an inflated version of the structure shown in FIG. 4, with the long side wall 126 and end 128. The interior baffles 124 help the structure maintain its shape.

Figure 6:
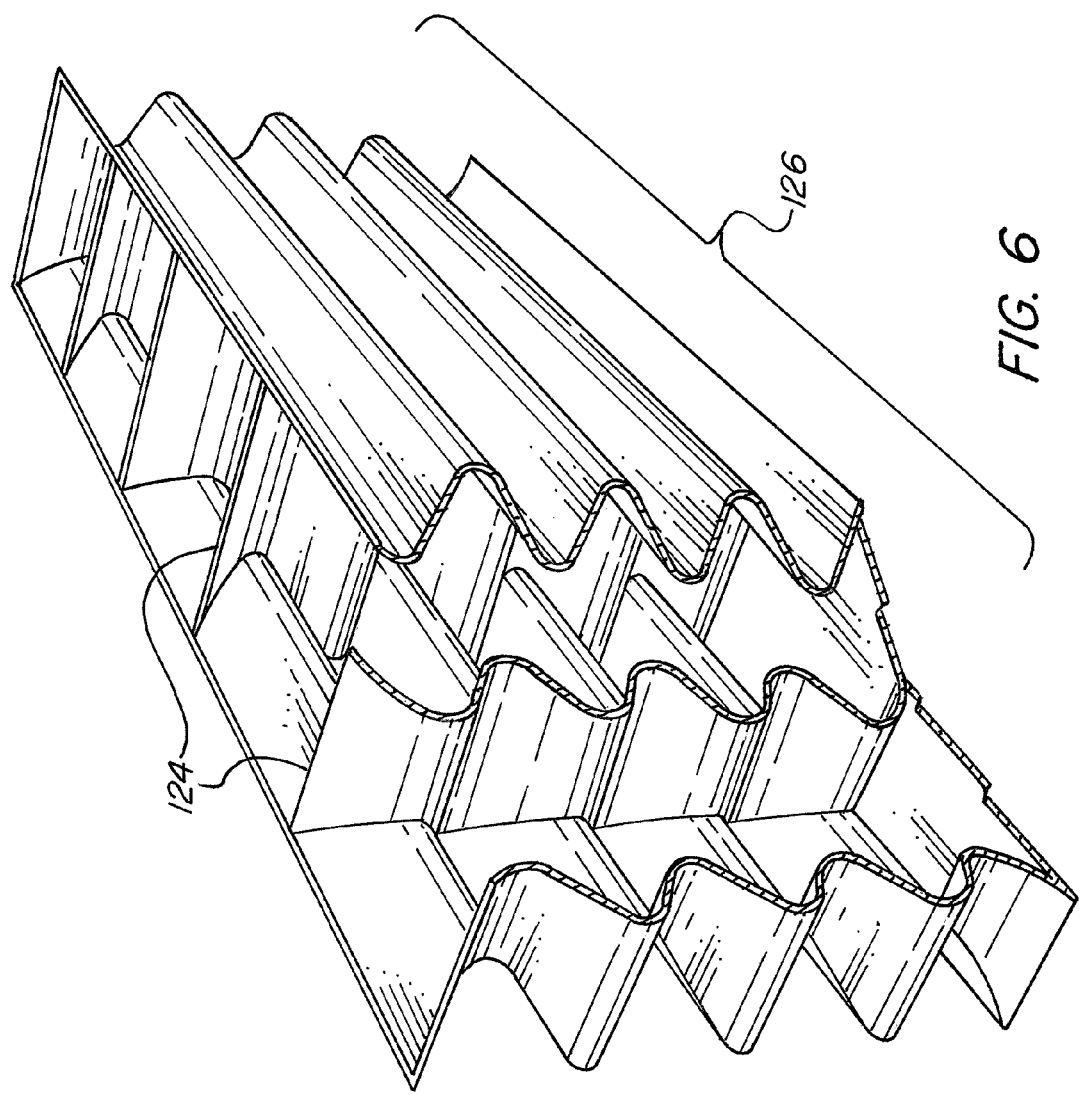
FIG. 6 is perspective side view of the expandable structure of FIG. 5 partially collapsed.

Referring now to FIG. 6, shown is a perspective side view of the expandable structure of FIG. 5 partially collapsed. The interior baffles 124 help the structure to maintain its side profile shape even as it is deflated. The corrugated long side wall 126 allows the structure to collapse to flat form.

Figure 7:
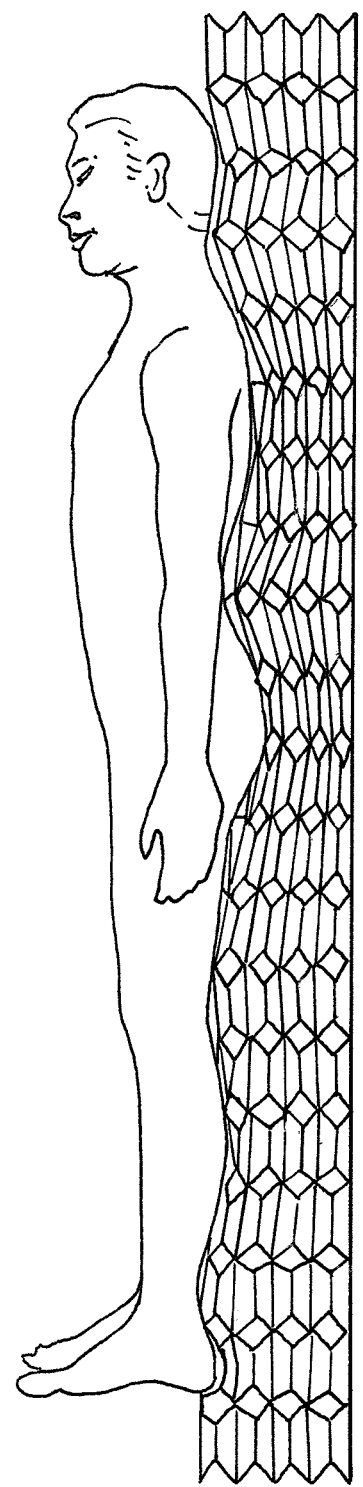
FIG. 7 is a side view of one embodiment of the expandable structures of FIG. 5 formed into a mattress.

Referring now to FIG. 7, shown is a side view of one embodiment of the expandable structures of FIG. 5 formed into a mattress. The expandable structures of the present teachings are preferably incorporated into a support surface or cushion structure. Any number of expandable structures may be manufactured together or joined together in different lengths to suit a particular purpose. For instance, the invention may be used in a mattress or as a wheelchair cushion, although not limited thereto. As shown, a mattress comprises a matrix of rows and columns of expandable structures.

The air pressure in each individual expandable structure (also referred to as a "cell") may be individually controlled to allow for maximum user comfort and support, although not limited thereto. To accomplish this, a port may be placed on a surface of the expandable structure. The port may be sealingly engaged with any surface of the structure. Alternatively, the port may be formed within a seal or may be sealingly engaged in the opening of a seal. The port may allow the structure to engage with an inflator or deflator.

Individual ports on each cell end of an expandable structure may allow each cell to function independently. For example, the expandable structure may be disposed around an object to be protected and inflated such that the cells envelop the object by adjusting to its shape. In one embodiment, certain of the individual cells may not communicate with each other (e.g., seals between certain cells may not have openings, etc.).

In another embodiment, the port may comprise a dip tube or strip. It may be disposed in the opening formed by the apex of a triangular portion or in an aperture in a seal and secured therein so as to pass over the spout opening or to be secured to the spout opening. This may prevent the structure from collapsing on the opening and closing of it during inflation, deflation, etc.

Figure 8:
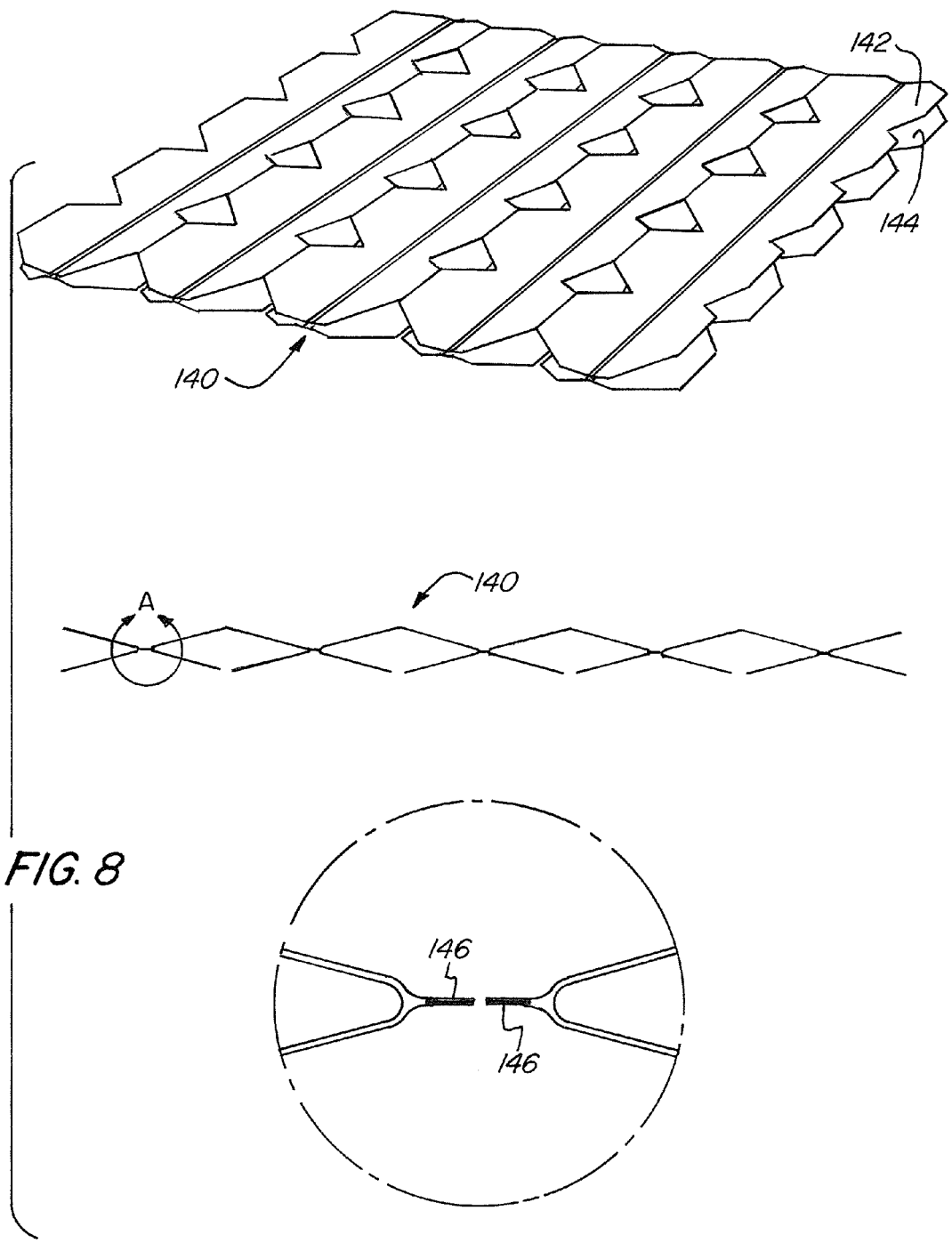
FIG. 8 is top perspective view depicting the interior baffles of FIG. 4 constructed using core baffle sheets.

Referring now to FIG. 8, shown is a top perspective view depicting the interior baffles of FIG. 4 constructed using core baffle sheets 140. As shown, adjacent interior baffles may be constructed together from sheets of material. As shown in the enlarged area of the figure, the top sheet 142 and bottom sheet 144 of material may be sealed together with pairs of seals 146, like those shown in relation to FIG. 1. The top 142 and/or bottom sheets 144 may have a concertina or other pattern cut into them. This may include cutting out a shape between adjacent baffles, although not limited thereto.

In this way, numerous adjacent interior baffles may be formed. Shown are five such baffles, however one skilled in the art would appreciate any number may be formed and the present teachings are not limited to any particular embodiment disclosed herein.

In one embodiment, adjacent baffles of the core baffle sheets 140 may have apertures (e.g., openings) between them to allow air to flow. As shown in FIG. 8, these may be cut into the bottom sheet 144, although not limited thereto.

Figure 9:
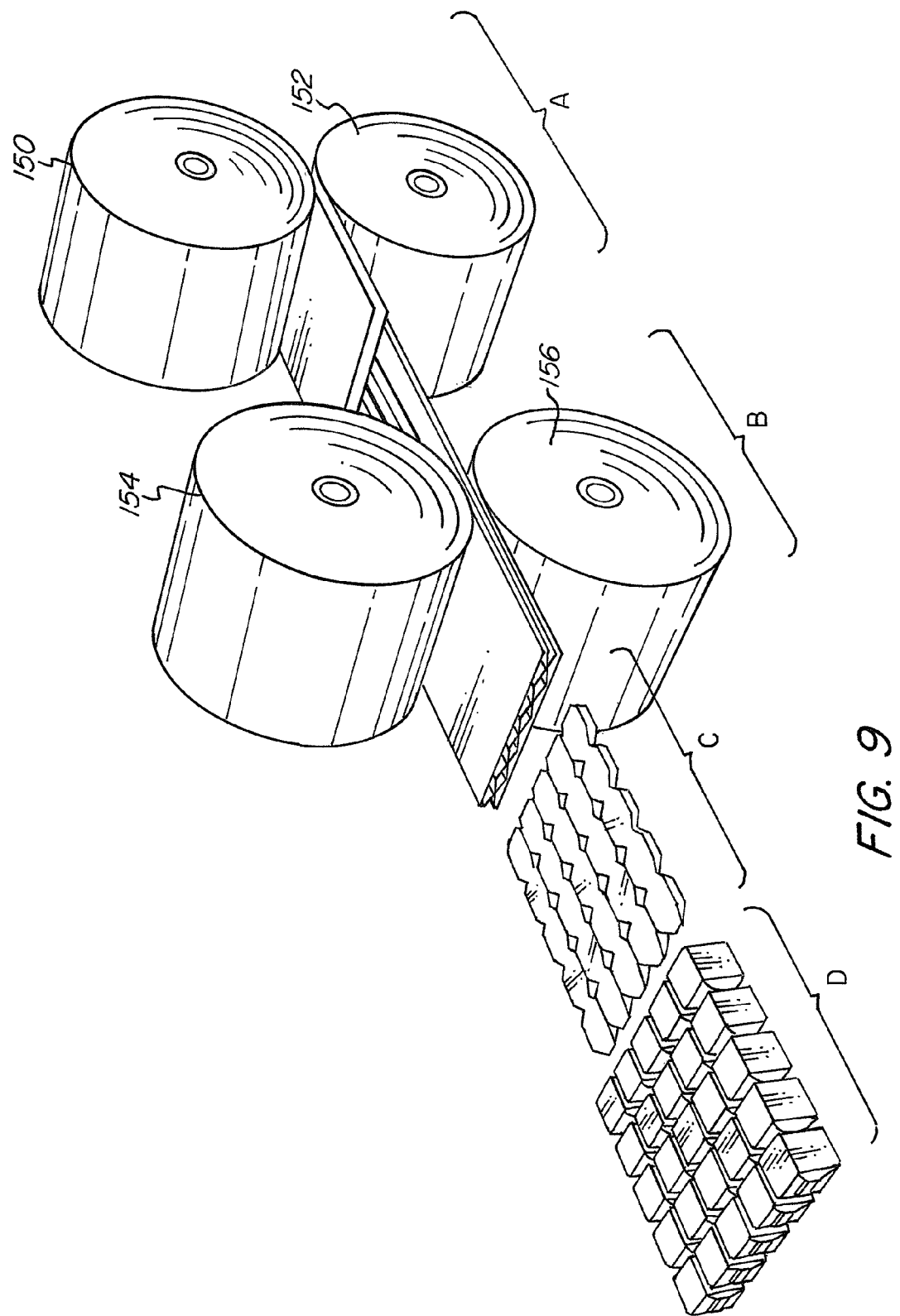
FIG. 9 is a top perspective view depicting a process for creating an expandable structure using the core baffle sheets of FIG. 8.

Referring now to FIG. 9, shown is a top perspective view depicting a process for creating an expandable structure using the core baffle sheets 140 of FIG. 8. For ease of reference, steps that may be performed are labeled as A, B, C, D. However, any number of steps may be utilized, in any order, without deviating from the present teachings.

Referring to step "A", a roll for a first sheet 150 and roll for a second sheet 152 of material (e.g., thermoplastic sheeting, etc.) may be joined (e.g., sealed, etc.) to form the core baffle sheets 140 (shown in FIG. 8). This sealing creates the system of interior baffles. In step "B", a roll for a top sheet 154 and a roll for a bottom sheet 156 of material may be joined to the core baffle sheets. In one embodiment, the bottom sheet may allow fluid communication between different sections by not completely sealing the rows apart from one another (shown in FIG. 10A). In step "C", the expandable structure may be cut to a desired size, and in step "D" the expandable structure may be inflated.

As shown, a continuous manufacturing process may create long sheets of expandable structures that may be placed on a roll and cut to various sizes by an end user or cut to size in a later manufacturing step. What is meant by "continuous manufacturing process" is that the material may be provided in long lengths (e.g., by feed rolls, etc.) and the manufacturing process may be performed repeatedly on the lengths of material to create the expandable structures.

When structures of specific sizes are made, the concertina pattern may be cut into the film such that substantially triangular end portions are formed at the front and back end of the sealed sheet. The apex of the triangular portion may be sealed together or may remain unsealed to create an opening. When the concertina pattern is cut into the film in such a way that the sealed sheet is tubelike, a sealing member, such as a substantially rectangular thermoplastic sheet, may be joined (e.g., welded, sealed) to the edges of the opening of the tube. The joint may contain one or more apertures.

Sealing may in one embodiment be performed by a sealing head, which may simultaneously cut and seal a bonded portion. Various configurations of bonds can be cut and sealed and used to create cells with any number of surface geometries, although not limited thereto.

Figure 10A:
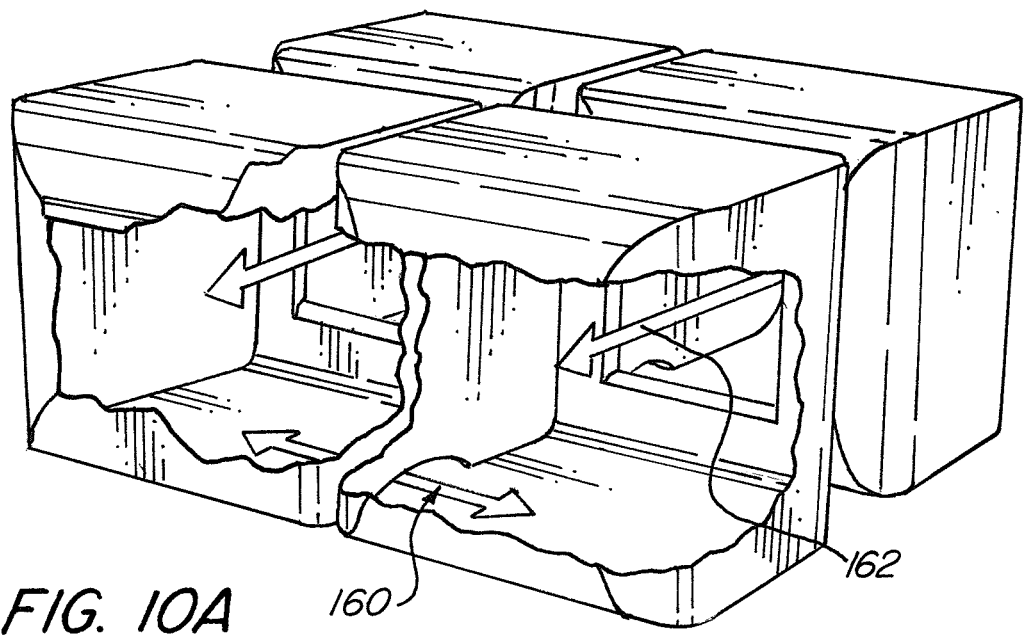
FIGS. 10A and 10B are different embodiments of expandable structures manufactured according to the process of FIG. 9.
Figure 10B:
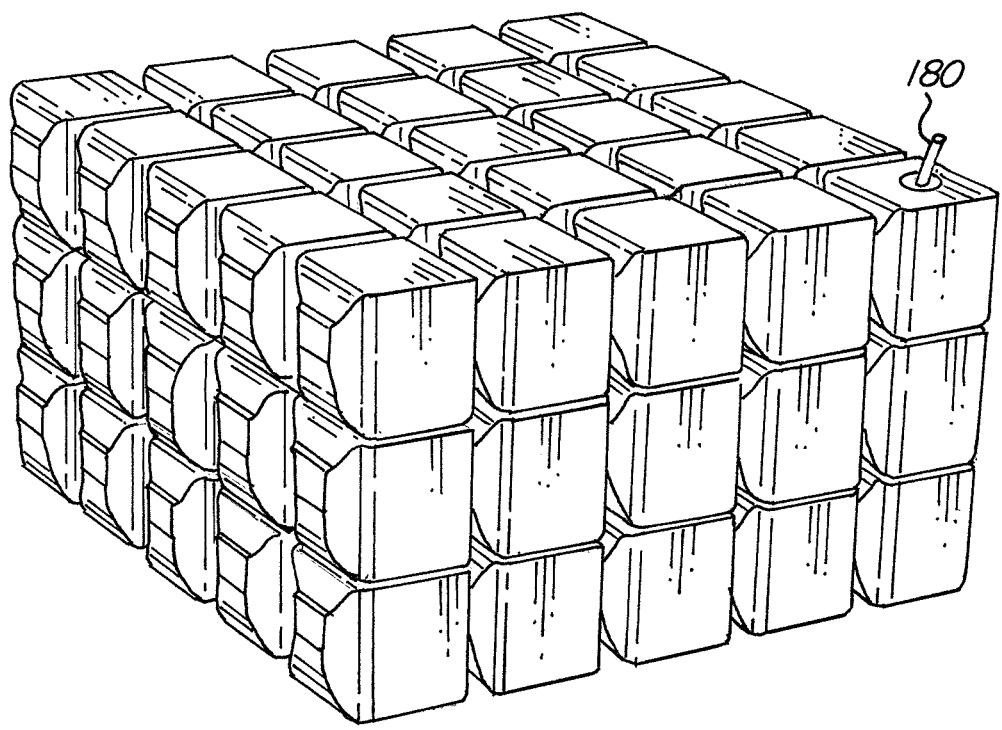

Referring now to FIGS. 10A and 10B, shown are different embodiments of expandable structures manufactured according to the process of FIG. 9. As shown in FIG. 10A, the bottom sheet may not completely seal the cells apart from one another in a row, allowing air (or other liquid) to flow 160 between them. In addition, air may flow 162 between adjacent cells in a column. One skilled in the art would appreciate that there are a number of different ways the cells may be joined in order to allow fluid communication (e.g., air, liquid, etc.) between adjacent cells and the present teachings are not limited to any particular embodiment disclosed herein. Fluid may be introduced by a port 180.

The cells may also be arranged in any configuration. A single row may allow for linear flexibility. Additionally, the individual rows of a matrix can be arranged in an offsetting pattern in order to adjust the level of flexibility. The point of communication between each cell can also create various configurations. As an example, an s-curve profile and u-curved profile may be desired. It is to be appreciated that the structure can be made in any number of different formations and the present teachings are not limited to any particular embodiment disclosed herein.

As shown in FIG. 10B, multiple cells can be formed in line by adding additional webs creating different chamber heights. The expandable structures of the present teachings are preferably incorporated into a support surface or cushion structure. For instance, the present teachings may be used in a mattress, pillow or as a wheelchair cushion. Multiple cell matrices may be joined together to allow for a support structure having various adjustable inflation zones. One skilled in the art would appreciate the many uses for the structures, which are not limited to any particular embodiments disclosed herein.

Additional applications for the expandable structures include coverings, compression garments, compresses, patient transfer devices, etc. For example, in one embodiment the expandable structures may be manufactured as a patient thermoregulation blanket. In this way, conditioned air (e.g., temperature controlled, moisture controlled, etc.) may be fed through the expandable structures adjacent to a patient's body (or other structure).

In one embodiment, one or more cells may have apertures (e.g., pin-sized holes in material, etc.) to allow air flow (e.g., controlled low air loss, etc.), which may assist with pressure relief and patient skin microclimate management, although not limited thereto. In another embodiment, the expandable structures may be manufactured in whole or in part from breathable non-woven material, although not limited thereto.

The use of lower mass films (e.g., relatively thin gauge polyethylenes and other thermoplastic polyolefins, etc.) for the material may be preferable to enhance the ability to warm or cool a patient. Such films may also be preferable to transmit and record patient vital signs (e.g., blood pressure, pulse, respiration, tissue interface pressure, etc.) as well as monitor activity (e.g., turning, leaving the bed, etc.). In one embodiment, the expandable structures may employ sensors attached thereon or disposed within one cell or more cells, which may be distributed with the expandable structures as a prepackaged diagnostic system, although not limited thereto.

In certain embodiments, the expandable structures could form a support with differing inflation patterns to assist in patient positioning (e.g., rolling, raising foot/head, etc.). A support formed by an expandable structure may also be preferable for a bariatric support surface, although not limited thereto. The expandable structures may provide increased height around its perimeter for a bolster effect, using increased inflation pressure of certain cells. This may provide for additional safety in certain embodiments (e.g., stability, to prevent head-entrapment, etc.). Meanwhile, partially inflated or un-inflated cells may be employed in other areas. This may be preferable, for example, when employed adjacent to a patient's sacrum to facilitate sacral muscle graft healing, or to alleviate pressure on a patient's ulcerated heels, although not limited thereto. One skilled in the art would appreciate the different uses for an expandable structures configured for a particular purpose and the present teachings are not limited to any particular embodiment disclosed herein.

In still further embodiments, the expandable structures may be used as a therapeutic device. For example, it may provide vibrations (or some other percussion) for pulmonary therapy. To enhance pressure relief, the mode of inflation for the individual cells within the matrix may include alternating pressure, a wave motion, etc., although not limited thereto. The expandable structures may be used to employ any number of different therapies (e.g., light, reflexology, etc.) and the present teachings are not limited to any particular embodiment disclosed herein.

The expandable structures may comprise layers of cells stacked to create multiple layer products, each layer having predetermined inflation patterns and or other characteristics. Support surfaces may utilize powered pumps for alternating pressure or low air loss. In an alternative, they could be pumped up once, the pump disconnected, and the surface used as a non-powered immersion surface, although not limited thereto. Contoured surfaces can be created by varying the cell heights and can be useful in relieving interface pressure, properly positioning a patient, and providing other advantages in comfort, safety, etc., although not limited thereto. It is to be appreciated that the structure can be made in any number of different formations and the present teachings are not limited to any particular embodiment disclosed herein.

Figure 11:
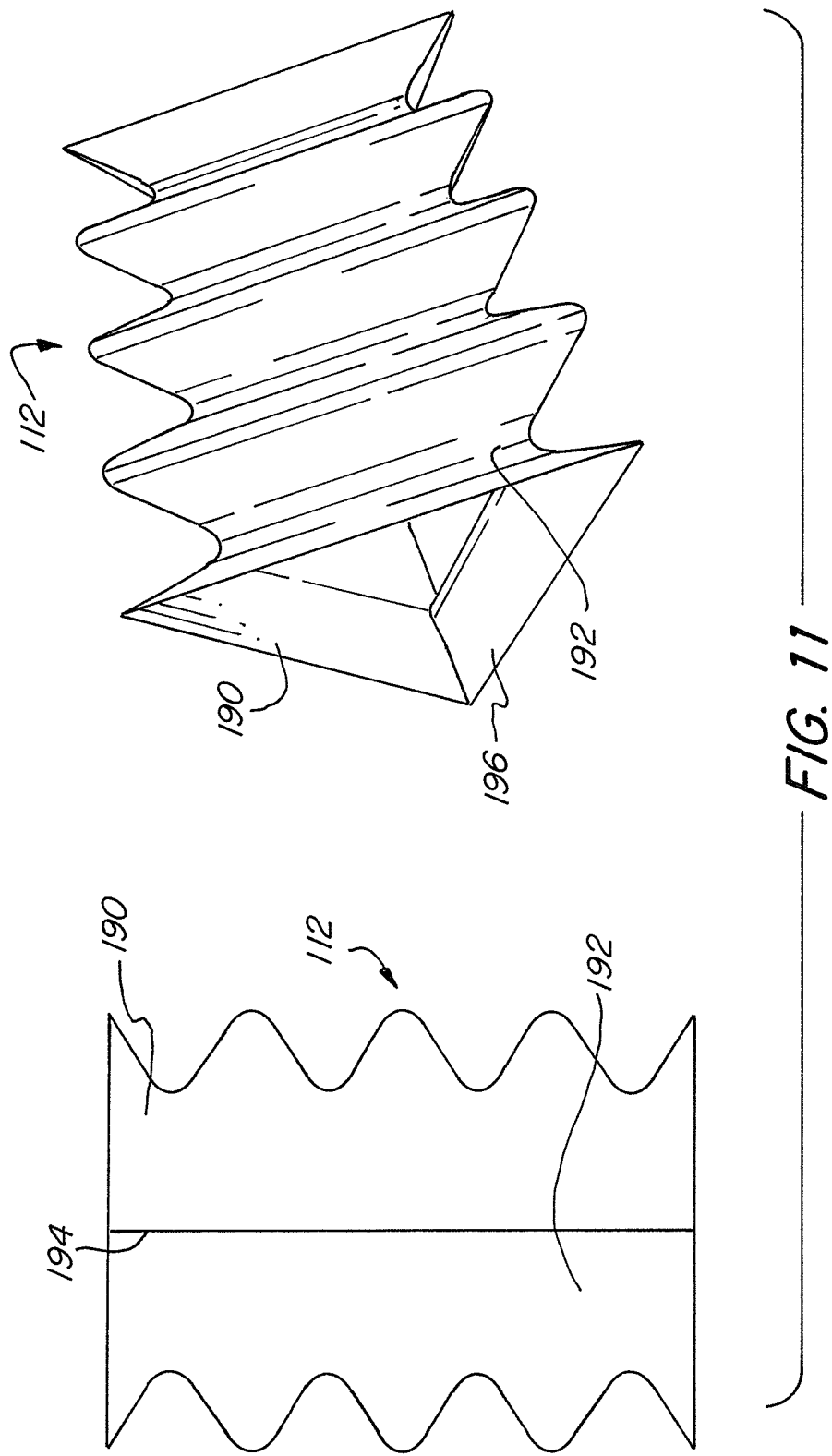
FIG. 11 is another embodiment of a three-sided expandable structure having the concertina pattern of FIG. 1.

Referring now to FIG. 11, shown is another embodiment of a three-sided expandable structure having the concertina pattern 112 of FIG. 1. As shown, three sheets 190, 192, 196 of material may be used. A bottom sheet 196 may be joined (e.g., sealed) to side sheets 190, 192. A concertina pattern 112 may be cut into the sheets. The side sheets 190, 192 may be sealed 194 to each other and a concertina pattern may be cut into them at their joint. In such a way, a three-sided expandable structure having a generally triangular shape may be manufactured. The joining (e.g., sealing) may be performed at the same time as the cutting of the concertina pattern 112, although not limited thereto.

It is to be appreciated that a concertina pattern according to the present teachings may be cut into an expandable structure having any number of sides. For example, a sheet forming a side may be manufactured to comprise multiple sheets forming multiple sides. Although specific embodiments are show, the present teachings are not limited thereto and an expandable structure with more than four sides may be constructed. In one embodiment, a five-sided expandable structure may be manufactured using five sheets of material. Such a structure may have a generally pentagonal shape.

Although specific features of the invention are shown in some drawings and not others, this is for convenience only as each feature may be combined with any or all of the features in accordance with the invention. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for manufacturing an expandable structure, comprising the steps of:
   joining together a first and second sheet of material with a seal along the lengths of the sheets;
   cutting the first and second sheets along the seal;
   joining at least a portion of the periphery of a third sheet of material to at least a portion of the periphery of the first sheet;
   joining at least a portion of the periphery of a fourth sheet of material to at least a portion of the periphery of the second sheet; and
   cutting a concertina pattern along at least a portion of the periphery of the sheets;
   wherein the expandable structure is adapted to be inflated with a fluid so that the sheets form a generally rectangular shape having a concertina pattern on its sides.

2. The method of claim 1 wherein the seal comprises a pair of seals generally parallel to each other and the step of cutting along the seal comprises cutting between the pair of seals.

3. The method of claim 1 wherein each of the first and second sheets has two sides generally parallel to its length; and the seal is in a middle area between the two sides.

4. The method of claim 1 wherein the step of cutting along the seal cuts the seal into two seals.

5. The method of claim 1 wherein the expandable structure is adapted to be stored in a substantially flat form when un-inflated; and wherein the expandable structure is adapted to provide support when inflated with a fluid.

6. The method of claim 1 wherein the material is provided by two or more feed rolls.

7. The method of claim 1, further comprising the step of creating a port on the expandable structure for introducing fluid.

8. The method of claim 1 wherein the material comprises sealable film.

9. The method of claim 1 wherein the material comprises thermoplastic.

10. The method of claim 1 wherein the step of cutting a concertina pattern is performed before the steps of joining the third and fourth sheets.

11. The method of claim 1 wherein the steps of joining together the first and second sheets and cutting the first and second sheets are performed in the same step.

12. The method of claim 1 wherein the steps of joining the third sheet, joining the fourth sheet, and cutting a concertina pattern are performed in the same step.

13. The method of claim 1 wherein at least one of the steps of joining the third and fourth sheets comprises sealing.

14. The method of claim 1 wherein the expandable structure is incorporated into a mattress.

15. The method of claim 1 wherein the expandable structure is incorporated into a cushion.

16. The method of claim 1 wherein the steps are repeated a plurality of times in a continuous manufacturing process.

17. The method of claim 1 wherein the step of cutting a concertina pattern comprises removing material between adjacent seals.

18. The method of claim 1 wherein the expandable structure comprises a plurality of cells and at least two of the plurality of cells are in fluid communication with each other.

19. The method of claim 18 wherein the plurality of cells comprises a plurality of inflation zones such that each inflation zone is adapted to be inflated at a different pressure.

* * * * *